3,105,072
NEW DERIVATIVES OF NICOTINIC ACID AND
PREPARATION THEREOF
Ernst Felder, Milan, Italy, and Hans Suter and Hans Zutter, Schaffhausen, Switzerland, assignors to Eprova Limited, Schaffhausen, Switzerland
No Drawing. Filed May 19, 1961, Ser. No. 111,189
Claims priority, application Switzerland June 27, 1960
10 Claims. (Cl. 260—247.2)

This invention relates to new derivatives of nicotinic acid and to a process for the production thereof.

The new derivatives of nicotinic acid provided by the present invention are active against bacteria and are thus therapeutically useful. The derivatives provided by the invention have the formula

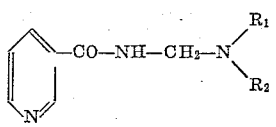

in which formula

is a tertiary amino group selected from the class consisting of the lower dialkylamino group, the lower alkyl-lower aralkyl-amino group, the di-lower diaralkylamino group and
a heterocyclic radical with one hetero atom selected from the group consisting of the pyrrolidino and the piperidino group and
a heterocyclic radical with two hetero atoms selected from the group consisting of the morpholino group, the N'-nicotinylaminomethyl-piperazino and the N'-lower alkyl-piperazino group.

The preferred compounds are those in which the tertiary amino group

represents a heterocyclic radical. Particularly important are the compounds containing a heterocyclic radical with 2 hetero atoms.

The morpholine derivative and especially the piperazine substituted with 2 nicotinylaminomethyl groups have proved to be very valuable and serviceable.

The invention also includes the acid addition salts of the above free bases with pharmacologically acceptable inorganic and organic acids, such as hydrochloric acid, sulphuric acid, tartaric acid, citric acid.

The antibacterial activity of the compounds of the invention is far superior to the activity of the N-(hydroxymethyl)-amide of nicotinic acid (the closest prior known compound) with respect to various types of pathologically acting microorganisms. This activity is most surprising, in that usually the replacement of a hydroxy function with a chemotherapeutically active compound by an amino function involves a reduction or the loss of the antibacterial effect.

The unusual activity of the compounds according to the invention is accompanied by a far greater stability as compared with the prior known N-(hydroxymethyl)-amide of nicotinic acid. For example, after oral application, they can be detected in the discharged urine without any microbiological change, whereas the latter amide is decomposed under the same conditions and discharged as nicotinic acid amide.

These facts can be attributed to a different type of activity mechanism.

The new compounds are moreover characterized by their generally excellent solubility in water, also by the fact that stable acid addition salts with practically a neutral reaction can be prepared.

As stated above the preferred compounds are the heterocyclic derivatives and, among these, the nicotinic acid-N-(morpholino-methyl)-amide and especially the 1,4-bis-(nicotinylamino-methyl)-piperazine have proved to be extremely valuable and active compounds.

By comparison with nicotinic acid-N-hydroxymethyl-amide, these compounds show an antibacterial activity which is 5 to 10 times stronger.

After oral administration of 500 to 1000 mg./kg. of the aforesaid compounds, the discharged urine shows a strong bacteriostatic effect. This effect does not occur after dispensing nicotinic acid-N-(hydroxymethyl)-amide.

The table given on page 5 shows the results of comparison tests between 3 substances according to the invention and a comparable, prior known compound used in similar manner.

In accordance with their specific properties, the compounds according to the invention are to be used as nicotinic acid amide derivatives, advantageously as disinfectants for the liver and gall bladder.

The invention also provides a process for the production of the new compounds which comprises converting nicotinic acid amide into the required final product by reaction with formaldehyde and a secondary amine of the formula

wherein

has the meaning defined above.

TABLE

| Formula of compound | Antibacterial activities—Minimum inhibitory concentrations in γ/ml.[1] | | | | | | Toxicity, g./kg. DL 50 | |
|---|---|---|---|---|---|---|---|---|
| | Staph. aureus | | E. coli | | Prot. vulg. | | Per os | Intraperitoneal |
| | From | To | From | To | From | To | | |
| (1) ⬡—CONHCH₂—N⟨H⟩O  See Example 1 | 156 | 312 | 312 | 625 | 156 | 312 | >4 | 2 |
| (2) ⬡—CONHCH₂—N⟨H⟩N—CH₂—NH—CO—⬡  See Example 2 | 50 | 156 | 150 | 312 | 50 | 156 | 6.8 | ≥2.2 |
| (3) ⬡—CONHCH₂—N⟨CH₃, CH₂—CH₂—⬡⟩  See Example 3 | -------- | 156 | 156 | 312 | -------- | 156 | -------- | -------- |
| (4)[2] ⬡—CONHCH₂—OH | 625 | 1,250 | 2,500 | 5,000 | 625 | 1,250 | Ca. 4 | 2.5 |

[1] From—to=Minimum and maximum numerals, indicating the range of the minimum inhibiting concentration.
[2] Closest prior known compound which is used for the same indication. (Med. Monatsschrift 9,606 (1955).) Chemical Abstracts 49, 15072e (1955).

NOTE.—Staph. aureus=Staphylococcus aureus. E. coli=Escherichia coli. Prot. vulg.=Proteus vulgaris.

This conversion can take place directly (by simultaneous action of formaldehyde and the required secondary amine) but if necessary also in stages, by firstly converting nicotinic acid amide into nicotinic acid-N-(hydroxymethyl)-amide or an ether or thioether of nicotinic acid-N-(hydroxymethyl)-amide or into nicotinic acid-N-(diethylaminomethyl)-amide by reaction with formaldehyde or a compound yielding formaldehyde (paraformaldehyde, trioxymethylene, etc.) and if necessary subsequent or simultaneous conversion with alcohols, thioalcohols or with diethylamine, and then converting this intermediate product by reaction with a secondary amine of the formula

into the required final product.

The conversion by way of nicotinic acid-N-(hydroxymethyl)-amide has proved especially suitable.

This conversion of nicotinic acid-N-(hydroxymethyl)-amide with a secondary amine of the formula

is most advantageously effected by direct heating of the components to 90 to 130°, preferably 100 to 110° C., without using a solvent, the use of equivalent quantities of the secondary amine being sufficient. As shown in Example 2b below, the conversion can however also be carried out successfully in the presence of a solvent. For example, the secondary amine can also be used in excess. These steps, which make the process more costly, are however not necessary.

The invention is further illustrated by the following examples:

EXAMPLE 1

*Nicotinic Acid-N-(Morpholino-Methyl)-Amide*

30.4 parts by weight of nicotinic acid-N-(hydroxymethyl)-amide and 17 parts by weight of morpholine are intimately mixed and carefully heated in an open glass flask in an oil or glycerine bath (bath temperature 120 to 130° C.). The reaction mass becomes increasingly liquefied. With relatively large batches, the mixture can be stirred. After the reaction material has reached a temperature of about 100 to 105° C., a complete solution is obtained, i.e. a clear melt has formed. A slight evolution of gas (slight foaming) occurs. The melt is kept for about 1 hour at 100 to 105° C. (internal temperature) and then cooled.

On seeding or on standing for a relatively long time, crystallization occurs. The nicotinic acid-N-(morpholinomethyl)-amide thus obtained melts at 102 to 105° C. after having been recrystallized once from a relatively small quantity of ethyl acetate. After being recrystallized twice, the melting point rises to 108 to 110° C.

Yield (pure): 30 to 36 parts by weight, i.e. 67 to 82% of the theoretical.

Nicotinic acid-N-(morpholino-methyl)-amide is quite readily soluble in water, readily soluble in methanol, acetone, warm ethyl acetate and hot benzene, soluble in cold ethyl acetate, slightly soluble in diethylether, petroleum ether and benzines.

With inorganic and organic acids, this compound forms the acid addition salts having a weak acid reaction in water. Preferred acids are: Hydrochloric and tartaric acids.

EXAMPLE 2

*1,4-Bis-(Nicotinylaminomethyl)-Piperazine*

(a) 30.4 parts by weight of nicotinic acid-N-(hydroxymethyl-amide and 19.4 parts by weight of piperazine×6H₂O are well mixed in a mortar and carefully heated in an open flask in an oil or glycerine bath with constant temperature control (bath temperature 110 to 120° C.).

The reaction mass gradually liquefies on heating and forms a homogeneous melt, mainly with relatively small batches, after reaching a temperature of about 90 to 100° C. There is moderate evolution of gas (H₂O↗).

With further heating, a crystal magma is formed which becomes increasingly more viscous.

The temperature of the reaction products is kept at 100 to 105° C. for about 30 to 45 minutes.

After cooling, the reaction material solidified in crystalline form is finely powdered, suspended in ethyl acetate, suction-filtered, washed with a little petroluem ether and dried.

Yield: 32.7 parts by weight (92% of the theoretical) of 1,4-bis-(nicotinylaminomethyl)-piperazine with the melting point 204 to 206° C.

This compound is readily soluble in glacial acetic acid, soluble in water (about 1.3%) and warm ethanol, but scarcely soluble in acetone, ethyl acetate, chloroform and benzines. It can be recrystallized from ethanol, the melting point rising to about 215 to 220° C. The compound does not have an exactly defined melting point. If when determining the melting point heating is continued after liquefaction has occurred, decomposition of the substance is observed at about 250° C.

The hydrochloride addition salt of 1,4-bis-(nicotinylaminomethyl)-piperazine is fairly readily soluble in water. It has a substantially neutral reaction (pH~6).

The 1,4-bis-(nicotinylaminomethyl)-piperazine can however be obtained by reaction of nicotinic acid-N-(hydroxymethyl)-amide with piperazine in a solvent.

(b) 15.2 parts by weight of nicotinic acid-N-(hydroxymethyl)-amide in 80 parts by volume of ethanol are mixed while stirring with a solution of 9.7 parts by weight of piperazine hexahydrate in 30 parts by volume of ethanol and thereafter immediately boiled for 4 to 7 hours under reflux. The cloudy solution which forms is filtered until clear and thereafter evaporated to dryness in vacuo. The solid residue from the evaporation is suspended in a little ethyl acetate, suction-filtered, thoroughly washed with ethyl acetate and then dried in a desiccator.

The 1,4-bis-(nicotinylaminomethyl)-piperazine thus obtained with quite a good yield melts at about 200° C. and is decomposed on further heating at about 250° C.

EXAMPLE 3

Nicotinic Acid-N-[(N'-β-Phenyl-Ethyl-N'-Methyl)-Aminomethyl]-Amide 7.6 parts by weight of nicotinic acid-N-(hydroxymethyl)-amide and 6.88 parts by weight of N-β-phenylethyl-N-methylamine are thoroughly mixed and heated in an open flask in a glycerine bath carefully to 128 to 132° C. (bath temperature). The reaction mass quickly forms a clear melt, which occasionally is carefully stirred. The melt is kept for about 65 to 75 minutes in a hot bath at a temperature of about 130° C. There is temporary a slight evolution of gas. After cooling, the reaction material is triturated with cold di-i-propylether (whereby complete crystallization occurs) and then suction-filtered. For purification purposes, the product is recrystallized once or twice more from a mixture of a large quantity of di-i-propylether and some ethyl acetate.

Yield: 10 to 11.85 parts by weight, i.e. 72 to 85% of the theoretical. M.P.: 115 to 117° C.

This new compound is soluble in warm water, very readily soluble in ethanol, acetone and ethyl acetate, but less soluble in cold di-i-propylether, petroleum ether and benzines. The acid addition salts thereof are very readily soluble in water.

EXAMPLE 4

In analogous manner to that described in Example 3, by heating equimolar quantities of nicotinic acid-N-(hydroxymethyl)-amide and N-(1,2-diphenyl-ethyl)-N-methyl-amine (obtained by reaction of benzalmethylamine with benzylmagnesium chloride at subsequent hydrolysis (B.P. 166 to 167° C./16 mm.) for 25 to 30 minutes to 130 to 140° C., there is obtained the nicotinic acid-N-[(N'-1,2-diphenyl-ethyl-N'-methyl)-amino-methyl]-amide which melts at 105 to 107° C. and is readily soluble in most polar solvents. The hydrochloride addition salt and the acid tartrate of this compound are very readily soluble in water.

EXAMPLE 5

N-Methyl-N'-Nicotinylaminomethyl-Piperazine 30.4 parts by weight of nicotinic acid-N-(hydroxymethyl)-amide and 20 parts by weight of N-methyl-piperazine are thoroughly mixed and heated for 45 minutes to 100 to 108° C. With discharge of water, a homogeneous melt of N-methyl-N'-nicotinylaminomethyl-piperazine is formed, this crystallizing after cooling and seeding.

Yield: Almost quantitative.

N-methyl-N'-nicotinylaminomethyl-piperazine is readily soluble in water, ethanol, i-propanol, soluble in ethyl acetate but only slightly soluble in diethylether and practically insoluble in petroleum ether and benzines.

It can be recrystallized from a very small quantity of methyl acetate, whereupon it melts at 112 to 114° C.

EXAMPLE 6

Nicotinic Acid-N-(Piperidino-Methyl)-Amide 30.4 parts by weight of nicotinic acid-N-(hydroxymethyl)-amide and 17 parts by weight of piperazine are heated for 50 minutes to 103 to 108° C. With discharge of water, the nicotinic acid-N-(piperidino-methyl)-amide is formed, which crystallizes after standing for a relatively long time and scratching with a glass rod.

The product thus obtained can be recrystallized from a very small quantity of ethyl acetate or methyl acetate, whereupon it melts at 94 to 96° C.

It is very readily soluble in water, ethanol, i-propanol, soluble in methyl and ethyl acetate, less soluble in diethyl-ether, very sparingly soluble in petroleum ether and benzines.

With 1 equivalent of an inorganic or organic acid, it forms the acid addition salts which only have a weak acid reaction in water.

EXAMPLE 7

Nicotinic Acid-N-(Pyrrolidino-Methyl)-Amide

In a manner analogous to that described in the above Examples 5 and 6, when 30.4 parts by weight of nicotinic acid-N-(hydroxymethyl)-amide and 14.2 parts by weight of pyrrolidine are melted together for 30 minutes at 98 to 92° C. and thereafter for another 45 minutes at 95 to 102° C., the nicotinic acid-N-(pyrrolidino-methyl)-amide is obtained, which is readily soluble in water, methanol, ethanol and i-propanol but scarcely soluble in diethylether, petroleum ether and benzines. Melting point after recrystallization from methyl acetate: 86° C.

EXAMPLE 8

(a) Nicotinic Acid-N-(Diethylaminomethyl)-Amide 40.7 parts by weight of nicotinic acid amide, 30 parts by weight of 35% aqueous formaldehyde and 150 parts by volume of diethylamine are heated for 4 hours on a water bath. The solution which has formed is now completely concentrated by evaporation in vacuo at 40 to 50° C. The residue from the evaporation consists of nicotinic acid-N-(diethylaminomethyl)-amide, and is readily soluble in water.

(b) Nicotinic Acid-N-(Morpholino-Methyl)-Amide

The nicotinic acid-N-(diethylaminomethyl)-amide obtained according to example 8a is mixed with about 100 parts by volume of morpholine and so heated in a suitable vessel that a slow distillation takes place (bath temperature 130 to 140° C.)

The distillation temperature rises gradually from 60° to 100° C. and finally to 127° C. (the boiling point of morpholine). The distillate consists of a large quantity of diethylamine and of morpholine. In this way, the nicotinic acid-N-(diethylaminomethyl)-amide is reacted with exchange of the amino group to the nicotinic acid-N-(morpholino-methyl)-amide. The reaction solution is finally completely concentrated by evaporation in vacuo and the residue is recrystallized from a little ethanol, ethyl acetate or advantageously from methyl acetate, whereby there are obtained about 44 parts by weight (i.e. 60% of the theoretical) of nicotinic acid-N-(morpholino-4-methyl)-amide, with the melting point 108 to 109° C.

We claim:

1. The nicotinic acid-N(pyrrolidino-methyl)-amide of the formula

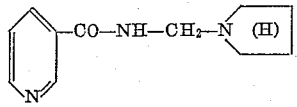

2. The nicotinic acid-N(piperidino-methyl)-amide of the formula

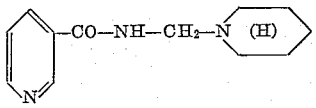

3. The nicotinic acid-N(morpholino-methyl)-amide of the formula

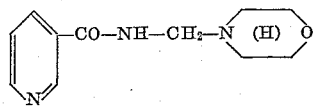

4. The 1,4-bis-(nicotinylamino-methyl)-piperazine of the formula

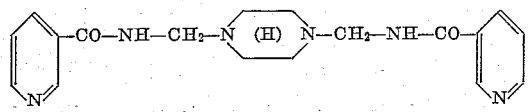

5. The N-methyl-N'-nicotinylamino-methyl-piperazine of the formula

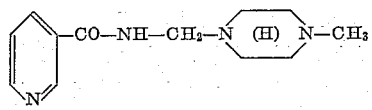

6. A process for the production of a nicotinic acid-(amino-methyl)-amide of the formula

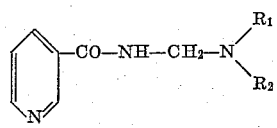

in which formula

is selected from the group consisting of the pyrrolidino, piperidino, morpholino, N'-nicotinylamino-methyl-piperazino, and N'-lower alkyl-piperazino group, which comprises reacting nicotinic acid-N-(hydroxymethyl)-amide with a secondary amine of the formula

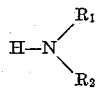

by direct heating a mixture thereof to a temperature of from 90 to 130° C. in the absence of a solvent.

7. A process for the production of nicotinic acid-N-(morpholino-4-methyl)-amide which comprises heating a mixture of nicotinic acid-N-(hydroxymethyl)-amide with morpholine at a temperature of from 90 to 130° C., for 30 to 90 minutes.

8. A process for the production of 1,4-bis-(nicotinyl-amino-methyl)-piperazine which comprises heating a mixture of two equivalents of nicotinic acid-N-(hydroxymethyl)-amide with 1 equivalent of piperazine to a temperature of from 90 to 130° C., for 30 to 90 minutes.

9. A chemical compound selected from the group consisting of (A) nicotinic acid-(aminomethyl)-amides of the formula

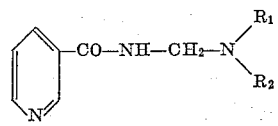

and (B) their acid addition salts with pharmacologically acceptable inorganic and organic acids, in which formula

is of the group consisting of the pyrrolidino, piperidino, morpholino, N'-nicotinylaminomethyl-piperazino, and N'-lower alkyl-piperazino group.

10. A process for the production of 1,4-bis-(nicotinyl-amino-methyl)-piperazine, which comprises heating a mixture of two equivalents of nicotinic acid-N-(hydroxymethyl)-amide with 1 equivalent of piperazine in ethanol under reflux for 4 to 7 hours.

References Cited in the file of this patent

UNITED STATES PATENTS

| | | |
|---|---|---|
| 2,009,144 | Miescher | July 23, 1935 |
| 2,846,438 | Yale et al. | Aug. 5, 1958 |
| 2,932,645 | Taylor et al. | Apr. 12, 1960 |

OTHER REFERENCES

Villani et al.: "J. Am. Chem. Soc.," volume 72, pp. 2724–7 (1950).

Chechelska et al.: "Roczniki Chem.," volume 27, pp. 396–409 (1953).